United States Patent
Belanger et al.

(10) Patent No.: US 10,207,686 B2
(45) Date of Patent: Feb. 19, 2019

(54) VEHICLE WASH COMPONENT FOR EMITTING BUBBLES

(71) Applicant: WashMe Properties, LLC, Northville, MI (US)

(72) Inventors: Michael J. Belanger, Northville, MI (US); Barry S. Turner, Northville, MI (US); David L. Tognetti, Howell, MI (US); Mark D. Morin, Plymouth, MI (US)

(73) Assignee: WashMe Properties, LLC, Northville, MI (US)

( * ) Notice: Subject to any disclaimer, the term of this patent is extended or adjusted under 35 U.S.C. 154(b) by 28 days.

(21) Appl. No.: 13/864,813

(22) Filed: Apr. 17, 2013

(65) Prior Publication Data

US 2014/0261578 A1 Sep. 18, 2014

Related U.S. Application Data

(60) Provisional application No. 61/800,769, filed on Mar. 15, 2013.

(51) Int. Cl.
*B60S 3/04* (2006.01)
*B01F 3/04* (2006.01)
(Continued)

(52) U.S. Cl.
CPC .......... *B60S 3/04* (2013.01); *B01F 3/04446* (2013.01); *B01F 5/0451* (2013.01);
(Continued)

(58) Field of Classification Search
CPC .......... B60S 3/04; B60S 3/06; B01F 3/04446; B01F 5/0451; B01F 5/0651; B01F 5/0693; Y10T 137/0402; Y10T 137/6966
(Continued)

(56) References Cited

U.S. PATENT DOCUMENTS 2,591,364 A * 4/1952 Kurth .......................... 239/317
3,035,293 A * 5/1962 Larson ........................ 15/53.3
(Continued)

FOREIGN PATENT DOCUMENTS

DE 202005005758 U1 6/2005
GB 2134002 A * 8/1984 ............... B01F 5/12
WO 2013067378 A1 5/2013

OTHER PUBLICATIONS

EPO International Search Report dated May 25, 2018 and Australian Examination Report No. 1 for Standard Patent Application dated Jun. 5, 2018.

*Primary Examiner* — Michael E Barr
*Assistant Examiner* — Tinsae B Ayalew
(74) *Attorney, Agent, or Firm* — John S. Artz; Dickinson Wright PLLC

(57) ABSTRACT

A device for emitting bubbles in a vehicle wash facility includes a plenum supported with respect to the ground. The plenum includes an air inlet with a first area and an air outlet with a second area. The plenum air outlet is in communication with at least one foaming chamber. The foaming chamber includes a generally planar media element disposed therein. The foaming chamber includes a spray jet located therein, which is in communication with a source of chemical. The spray jet configured to emit a chemical onto the generally planar media element. The device also includes a plurality of nozzle portions in communication with the foaming chamber for emitting bubbles therefrom.

35 Claims, 13 Drawing Sheets

(51) Int. Cl.
  *B60S 3/06* (2006.01)
  *B01F 5/04* (2006.01)
  *B01F 5/06* (2006.01)
(52) U.S. Cl.
  CPC .......... *B01F 5/0651* (2013.01); *B01F 5/0693* (2013.01); *B60S 3/06* (2013.01); *Y10T 137/0402* (2015.04); *Y10T 137/6966* (2015.04)
(58) Field of Classification Search
  USPC ......... 134/123; 137/15.04; 261/78.1, 81, 83, 261/100, 115, 119.1, 24
  See application file for complete search history.

(56) References Cited

U.S. PATENT DOCUMENTS

| | | | | |
|---|---|---|---|---|
| 3,784,111 | A * | 1/1974 | Piggott | B64D 1/18 239/171 |
| 3,903,562 | A * | 9/1975 | Miles | B60S 3/002 15/301 |
| 4,383,935 | A * | 5/1983 | Hull | 261/78.1 |
| 5,564,448 | A * | 10/1996 | Lincoln | B05B 15/658 134/166 R |
| 5,803,367 | A * | 9/1998 | Heard | B05B 7/0815 239/296 |
| 6,126,089 | A * | 10/2000 | Williamson et al. | 239/310 |
| 6,126,093 | A * | 10/2000 | Grether et al. | 239/428.5 |
| 6,202,279 | B1 * | 3/2001 | Belanger et al. | 29/428 |
| 6,935,576 | B2 * | 8/2005 | Hara | B05B 7/0475 239/104 |
| 7,438,075 | B1 * | 10/2008 | Huntington et al. | 134/57 R |
| 2008/0272148 | A1 * | 11/2008 | Malik et al. | 222/137 |
| 2011/0155192 | A1 * | 6/2011 | Ahmad | B60S 1/481 134/56 R |
| 2011/0277797 | A1 * | 11/2011 | Turner et al. | 134/123 |
| 2014/0223676 | A1 | 8/2014 | Belanger | |
| 2015/0210252 | A1 | 7/2015 | Belanger | |

* cited by examiner

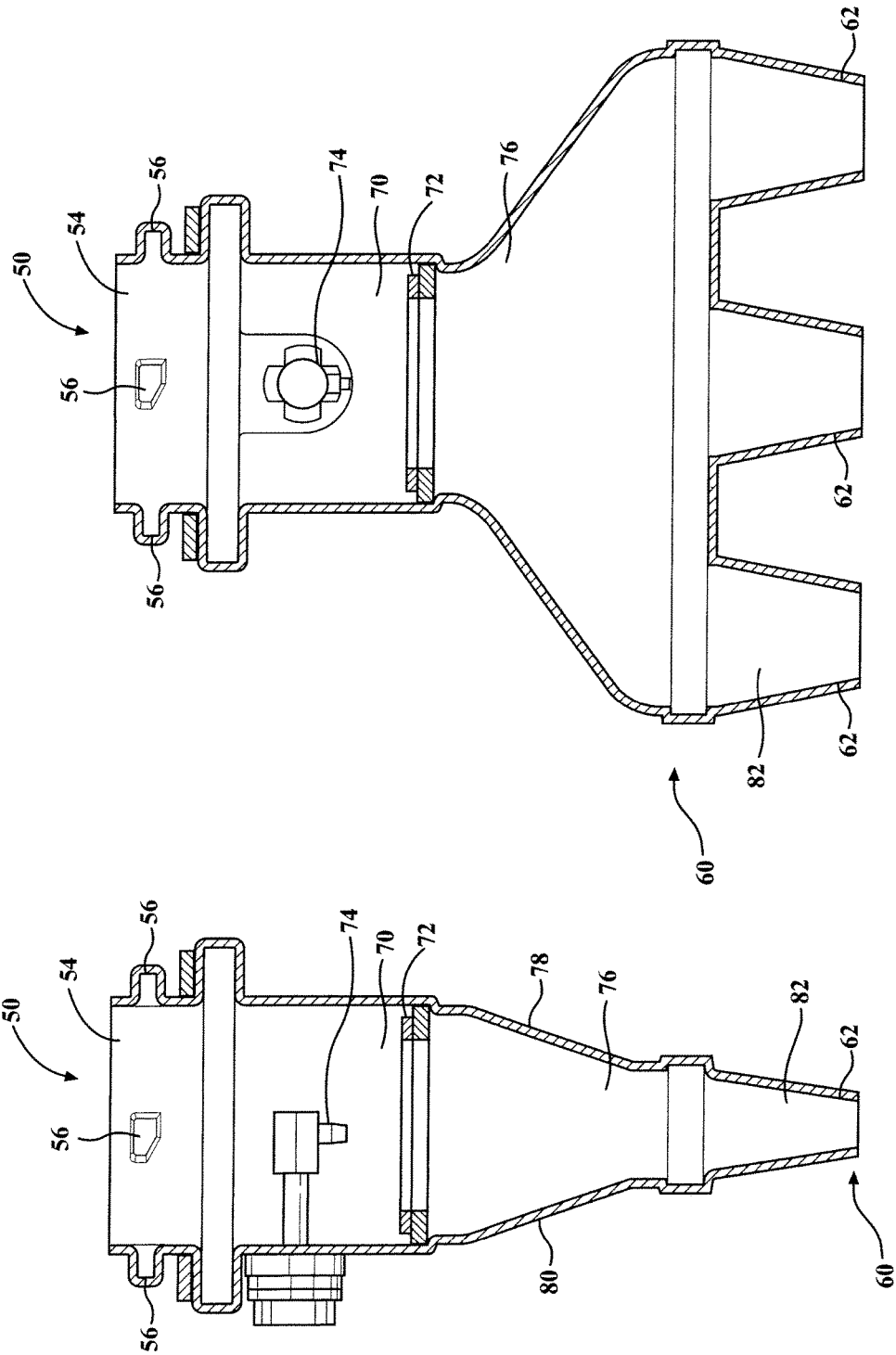

VEHICLE WASH COMPONENT FOR EMITTING BUBBLES

CROSS-REFERENCE TO RELATED APPLICATIONS

The present application claims priority to U.S. Provisional Patent Application Ser. No. 61/800,769, entitled "Bubble Arch Device, which was filed on Mar. 15, 2013, the disclosure of which is hereby incorporated by reference, as though set forth fully herein.

BACKGROUND OF THE INVENTION

1. Field of the Invention

The present disclosure relates generally to a device for emitting bubbles as may be used in a vehicle wash system. More particularly, the present disclosure relates a device for a vehicle wash system that emits bubbles in a fashion that they can be forcibly transmitted or propelled to a vehicle exterior or other component.

2. Description of the Prior Art

Soap and foam are widely used in vehicle wash facilities. Recently bubblers or bubble arches have been introduced for coating a portion of a vehicle exterior with bubbles. Current bubbling arches operate such that the "bubbles" are formed then conveyed to the vehicle exterior solely based on gravitational forces. These bubbling arches have limitations, including an inability to uniformly distribute the "bubbles" across the exterior surface of the vehicle. As such, the soap that is part of the foam may not contact the entire exterior surface of the vehicle to be treated. This can result in the vehicle exterior not being sufficiently cleaned as well as the perception in the mind of the vehicle operator that the vehicle exterior is not being sufficiently cleaned.

Also, while these current devices are self-referred to as bubblers, they really only generate foam, which is a fluid consisting of very small bubbles. The generation of these very small bubbles or foam requires the utilization of a large amount of chemical, which can be very expensive. Additionally, the foam generated by these devices has a very heavy appearance and is thus not aesthetically attractive.

It would therefore be desirable to provide a device that emits bubbles, such as for use in a vehicle wash process that overcomes the disadvantages and limitations that exist with these current devices.

SUMMARY OF THE INVENTION

It is therefore an aspect of the present disclosure to provide a device that emits bubbles onto another surface that overcomes the above disadvantages.

It is a related aspect of the present disclosure to provide a device for use in a vehicle wash system that emits bubbles onto an exterior surface of a vehicle such that the bubbles contact a greater portion of the vehicle exterior.

It is another aspect of the present disclosure to provide a device that can forcefully emit bubbles therefrom so they can be projected onto a desired surface.

It is a related aspect of the present disclosure to provide a device that is configured to forcefully emit bubbles onto a top and/or side exterior surface of a vehicle.

It is another related aspect of the present disclosure to provide a device that is configured to forcefully emit bubbles onto another component of a vehicle wash system, such as a rotary brush, so the bubbles can be applied to an exterior surface of a vehicle by the media elements of the brush.

It is a further aspect of the present disclosure to provide a device that is configured to emit bubbles in a fashion that can uniformly cover an exterior surface of a vehicle.

It is yet another aspect of the present disclosure to provide a device that can be configured to emit bubbles onto vertical surfaces of a vehicle exterior, such as side surfaces or wheels.

It is yet a further aspect of the present disclosure to provide a device for emitting bubbles that utilizes fewer chemicals and therefore decreases the costs associated with prior devices.

It is still yet a further aspect of the present disclosure to provide a method for manufacturing a bubbling device.

In accordance with the above and the other aspects of the present disclosure, a device for emitting bubbles for application to a structure in vehicle wash system is provided. The device includes a plenum supported with respect to ground. The plenum includes an air inlet having a first area and an air outlet having a second area. The plenum is in communication with a foaming chamber. The foaming chamber includes an aerating media element disposed therein. A fluid dispensing mechanism is disposed in the foaming chamber and in communication with a source of chemical. The fluid dispensing mechanism is configured to emit a chemical onto the aerating media element. The foaming chamber is in communication with a plurality of outlet elements in the fluid dispensing mechanism for emitting bubbles therefrom.

BRIEF DESCRIPTION OF THE DRAWINGS

Other aspects of the present disclosure will be readily appreciated, as the same becomes better understood by reference to the following detailed description when considered in connection with the accompanying drawings wherein:

FIG. 13 is a cross-sectional view of the single foaming chamber and nozzle of FIG. 12 in the direction of the arrows 13-13;

FIG. 14 is a cross-sectional view of the single foaming chamber and nozzle of FIG. 12 in the direction of the arrows 14-14;

DETAILED DESCRIPTION OF THE INVENTION

Figure 1:
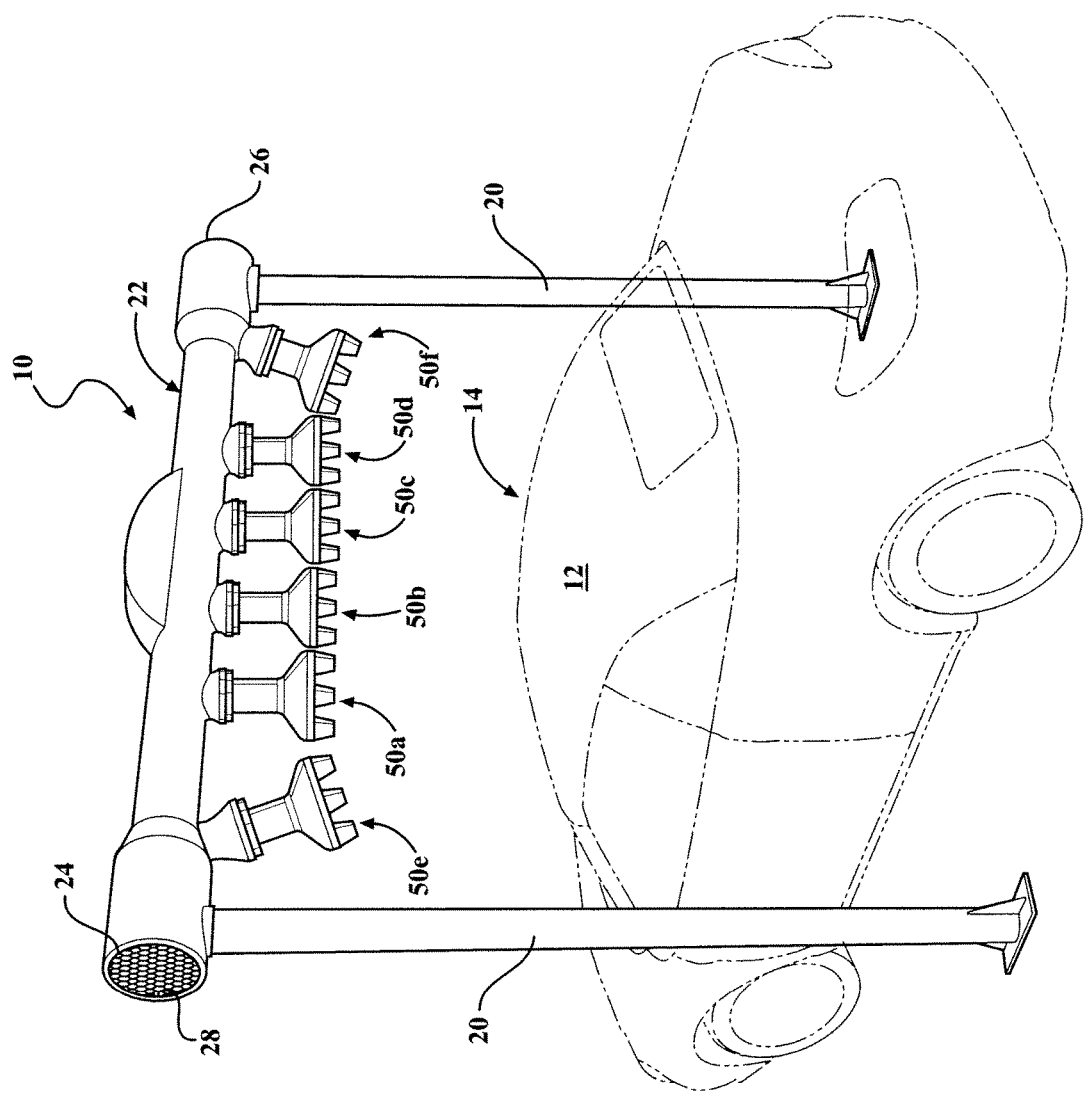
FIG. 1 is a perspective view of a device for emitting bubbles onto an exterior surface of a vehicle in accordance with an aspect of the disclosure.
Figure 2:
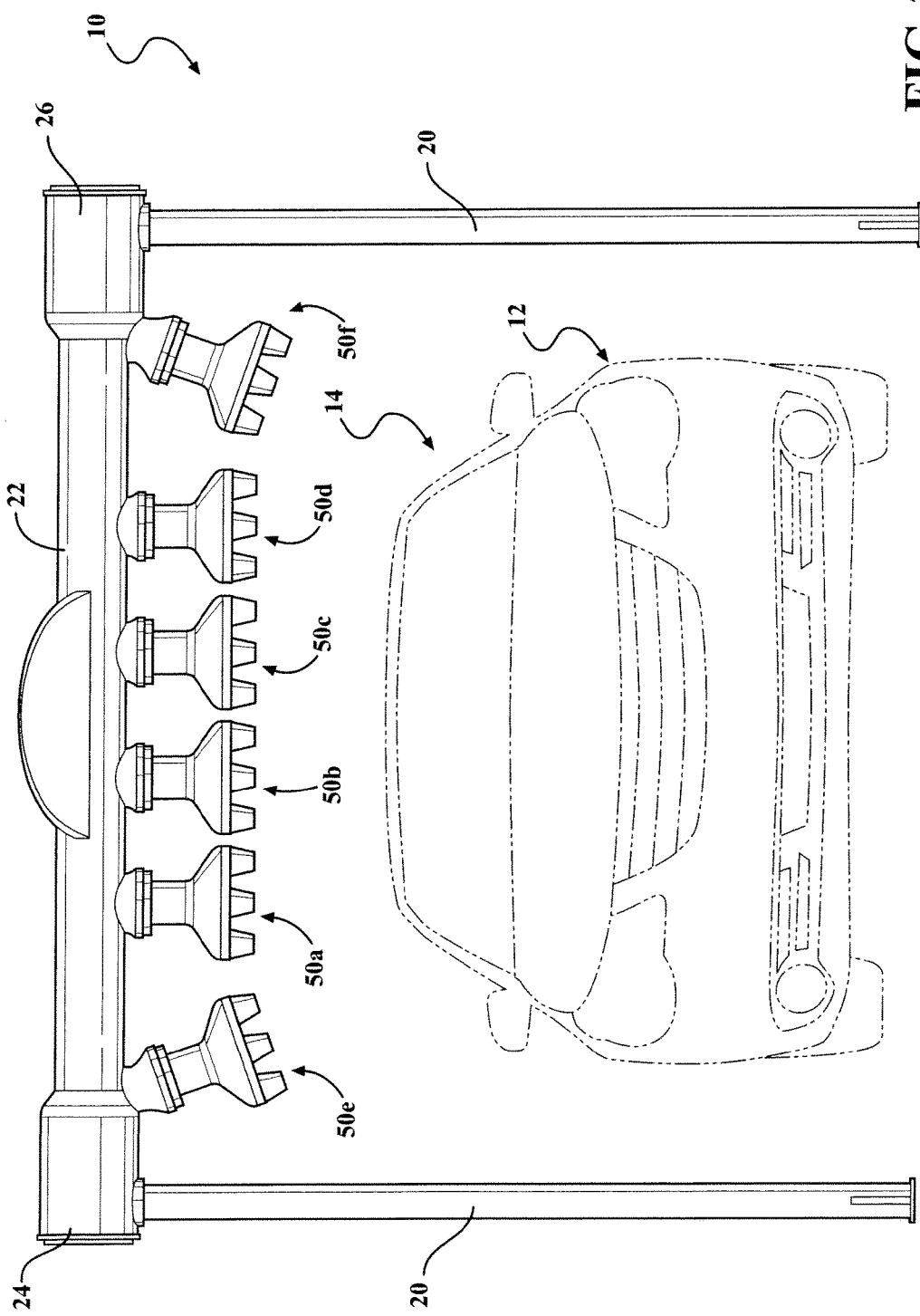
FIG. 2 is a front view of the device for emitting bubbles of FIG. 1 in accordance with an aspect of the disclosure.
Figure 3:
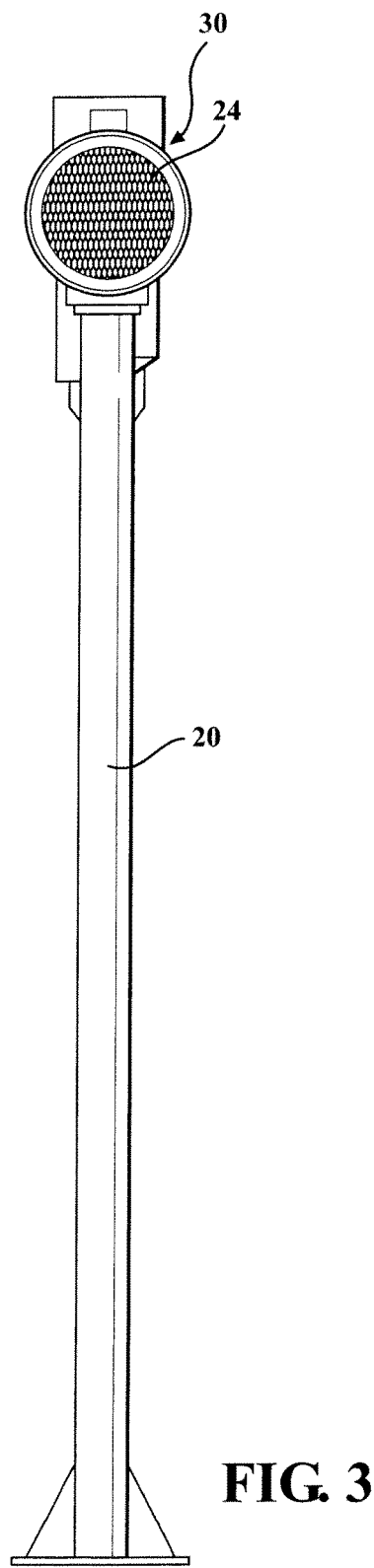
FIG. 3 is a side view of the device for emitting bubbles of FIG. 1 in accordance with an aspect of the disclosure.

The present disclosure relates to a device 10 for emitting bubbles. According to an aspect, the device 10 may be employed to emit bubbles onto an exterior surface 12 of a vehicle 14 as part of a vehicle wash process, as generally shown in FIG. 1. It will be appreciated that the device 10 can be utilized to emit bubbles onto any type of vehicle, such as an automobile or a truck. According to an aspect, the device 10 may be employed to emit bubbles onto a variety of other surfaces or for a variety of different applications. It will also be appreciated that the device 10 could be utilized for a variety of different applications outside of the vehicle wash industry.

According to an aspect and as shown in the FIGs, the device 10 can be configured to be disposed adjacent a vehicle treatment area in a vehicle wash facility. According to one aspect, the device 10 may be configured as an arch to emit bubbles onto a vehicle from a location above the vehicle. According to a further aspect, the device 10 may be configured to emit bubbles onto a vehicle from a location beside the vehicle. According to another aspect, this allows the device 10 may be configured to emit bubbles onto side surfaces of a vehicle and/or wheels. The device 10 can be used in any type of vehicle wash process, such as a tunnel wash or a roll-over wash. If employed in a vehicle wash facility, the device 10 can be utilized at the front end of process. Alternatively, the device 10 may be utilized a majority of the way down the wash facility in the buff and polish area to emit an extra service wax onto the vehicle. It will be appreciated that the device 10 may be utilized virtually anywhere in a vehicle wash process as desired.

In accordance with an aspect, the device 10 includes a support structure that contacts ground and serves to support the device. As shown in this example, the support structure may consist of a pair of legs 20 with each leg disposed on either side of the vehicle treatment area. According to another aspect, the device 10 may be disposed on one side of a vehicle treatment area. With this configuration, the support structure may consist of a base. It will be appreciated that the support structure can have a variety of different configurations. As shown, the device 10 can include a plenum 22 that may be oriented generally parallel to the ground. According to an aspect, the plenum 22 may have a first end 24 that is supported by one leg 20 and a second end 26 that is supported by another leg 20. The device 10 can be formed of a plastic material via a conventional plastic injection molding process. However, it will be appreciated that the device 10 may also be formed from a variety of other suitable materials and can be formed from a variety of other suitable processes.

Figure 10:
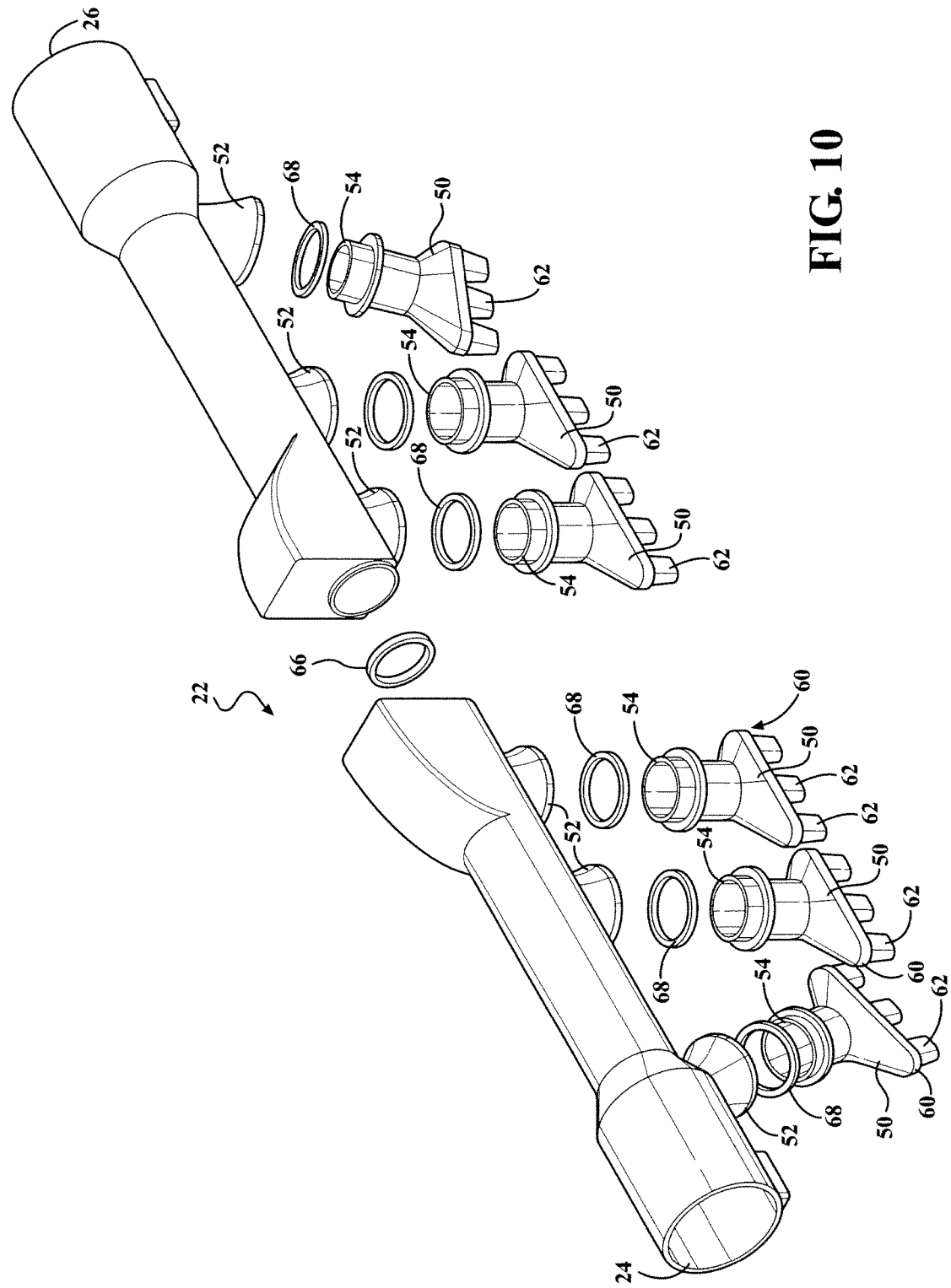
FIG. 10 is an exploded view of a plenum for the device for emitting bubbles in accordance with an aspect of the disclosure.
Figure 11:
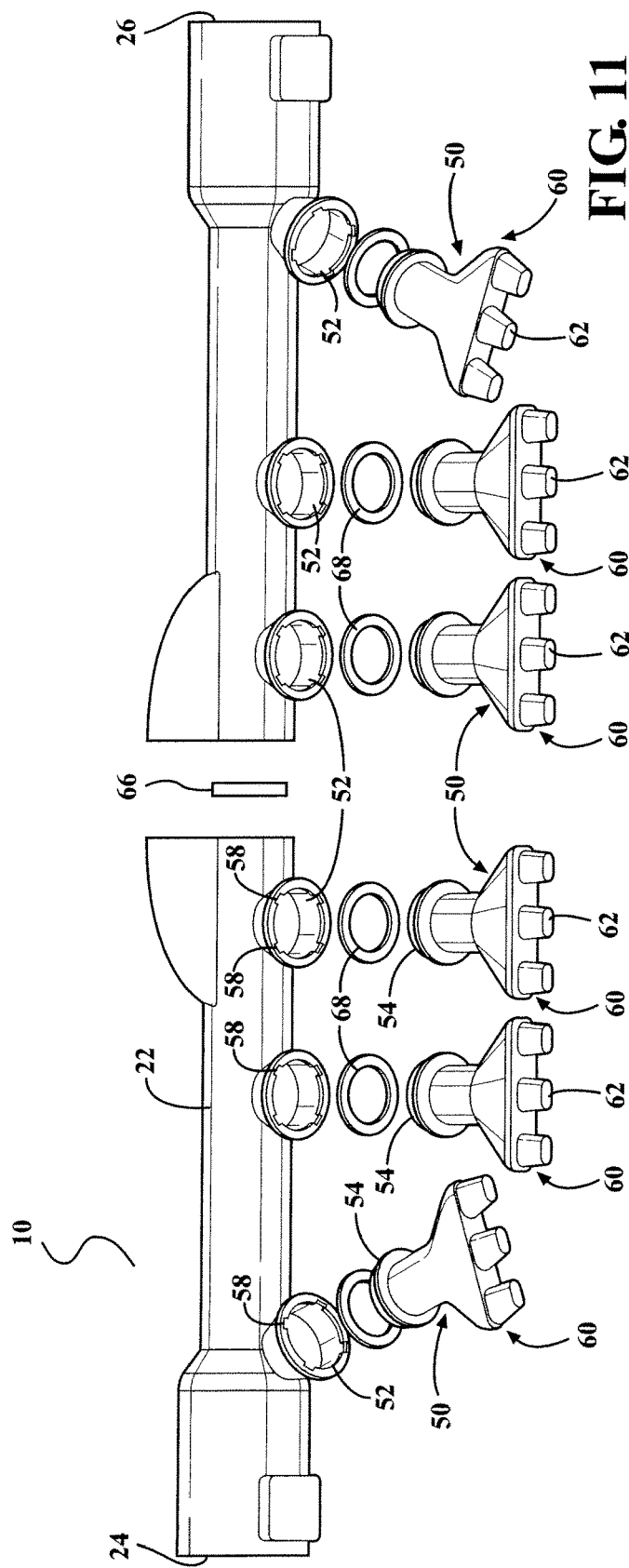
FIG. 11 is another exploded view of a plenum for the device for emitting bubbles in accordance with an aspect of the disclosure.
Figure 12:
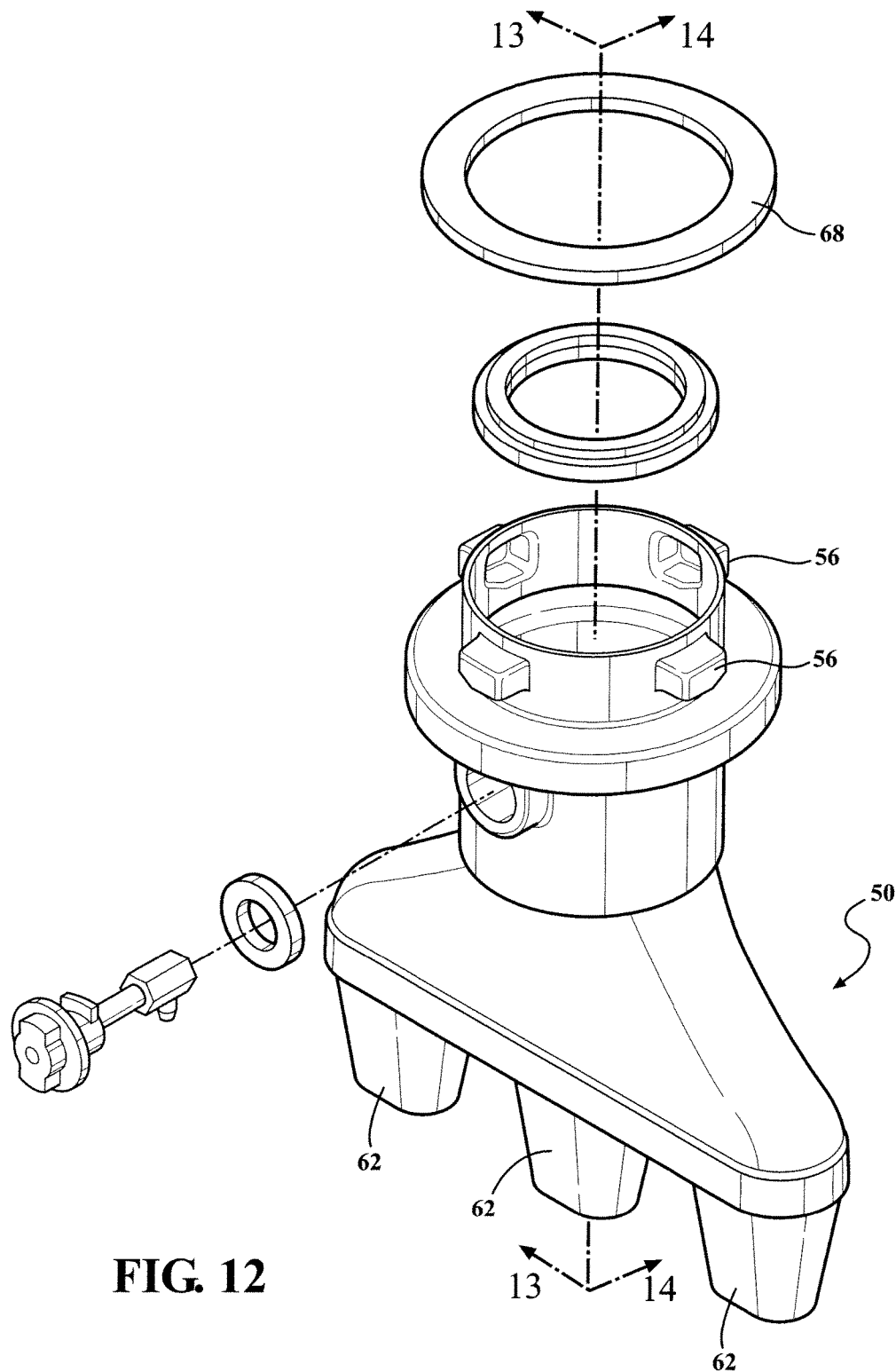
FIG. 12 is an exploded view of a single foaming chamber and nozzle for a device for emitting bubbles in accordance with an aspect of the disclosure.
Figure 15:
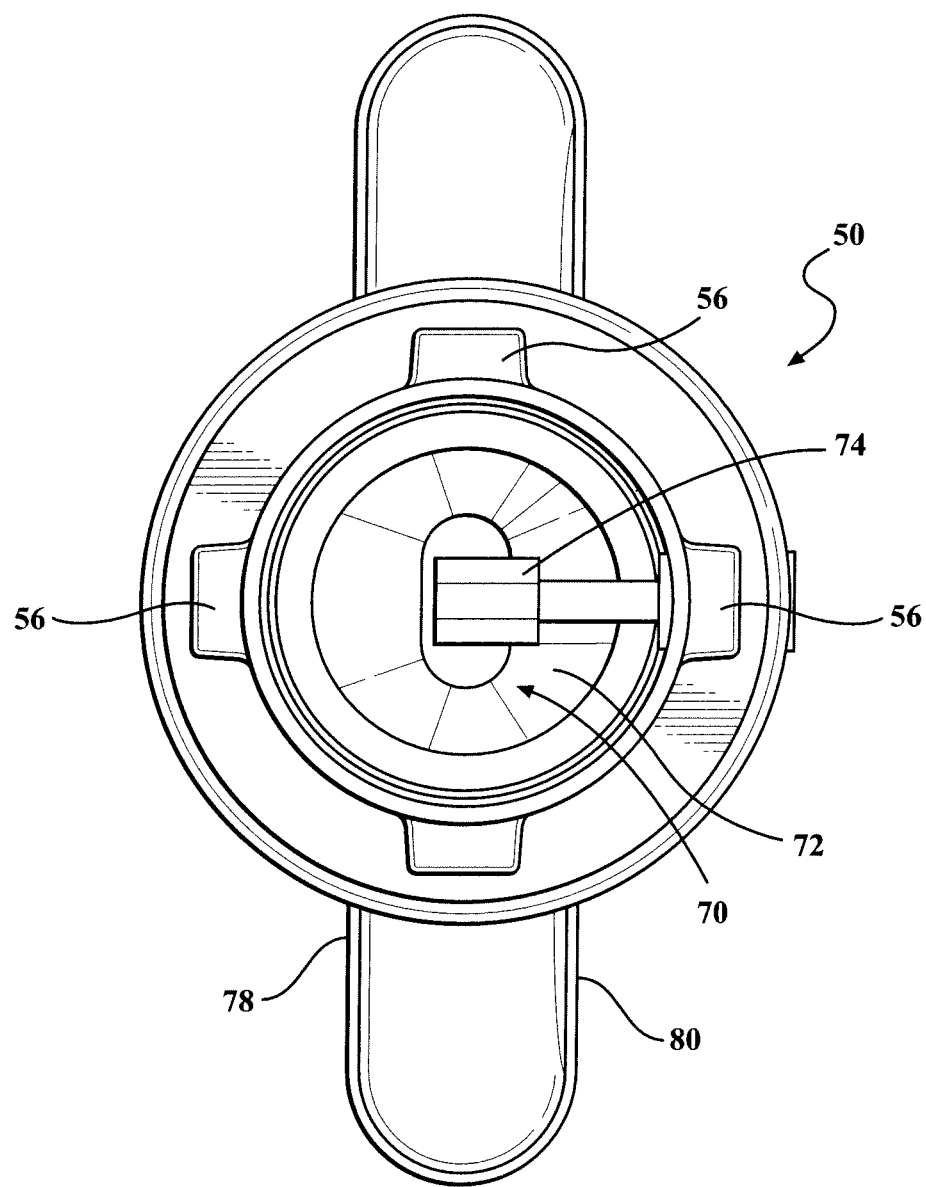
FIG. 15 is a top view of the single foaming chamber and nozzle of FIG. 12.

According to a further aspect, the plenum 22 may be formed by a rotational molding technique. According to yet another aspect, the plenum 22 may be formed by a blow molding process. With reference to FIGS. 10 and 11, the plenum 22 may be formed as two identical halves which are molded separately in a single molding process. The identical halves may be configured to be joined in the middle to form an elongated plenum according to one aspect. An O-ring, gasket or sealing mechanism 66 may be employed between the identical halves as will be understood by one of ordinary skill in the art.

According to one aspect, the plenum 22 can include an air inlet 28 located at the first end 24 that allows air to be drawn into the plenum 22. It will be appreciated that the air inlet 28 can be located at either end 24, 26 of the plenum 22. Additionally, the air inlet 28 may be located in a variety of other locations along the plenum 22 besides the ends. According to another aspect, the plenum 22 could include more than one air inlet opening.

Figure 4:
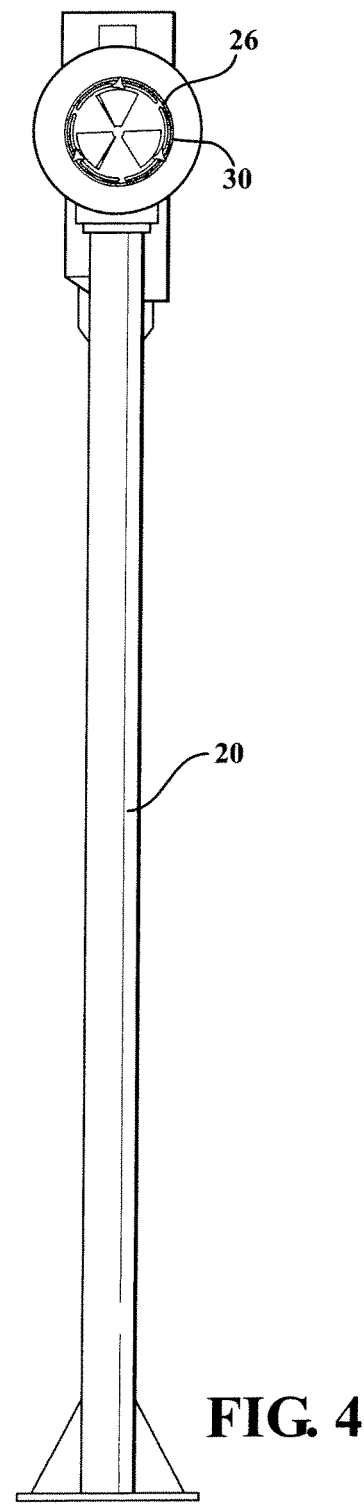
FIG. 4 is another side view of the device for emitting bubbles of FIG. 1 in accordance with an aspect of the disclosure.
Figure 5:
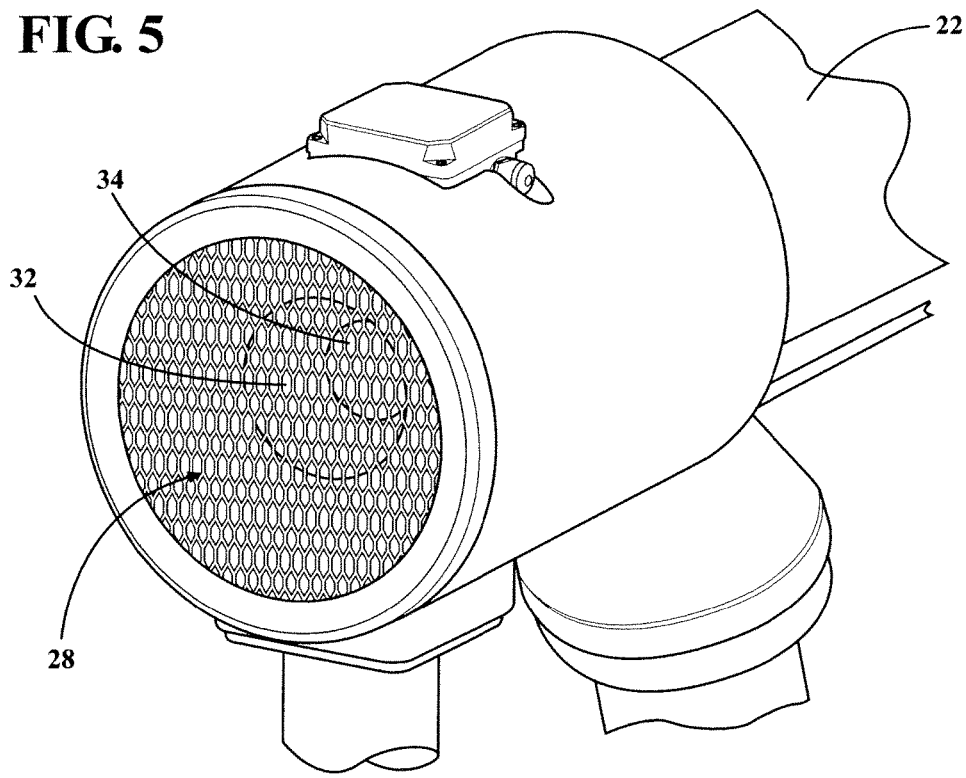
FIG. 5 is a perspective view of an air inlet opening for the device for emitting bubbles in accordance with an aspect of the disclosure.
Figure 8:
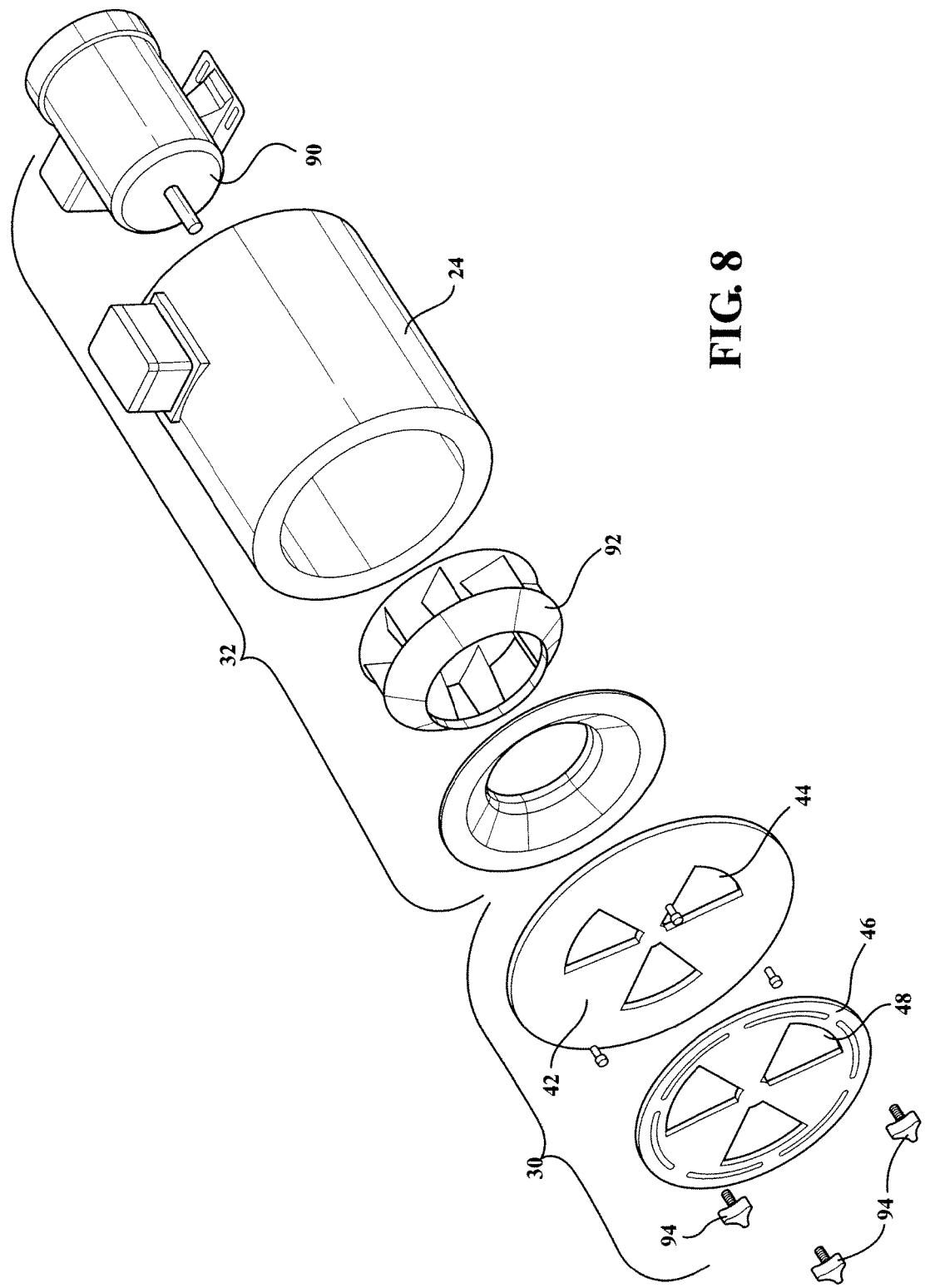
FIG. 8 is an exploded view of the airflow regulator of FIG. 6 in accordance with an aspect of the disclosure.

According to an aspect, the plenum 22 can be configured to allow the airflow through the air inlet 28 to be varied. According to still another aspect, the plenum 22 can include an air regulator mechanism 30 that allows the air that flows through the air inlet 28 and into the plenum 22 to be controlled or varied by an operator. It will also be appreciated that the air flow rate may be varied automatically under computer control. According to an aspect, a blower or fan 32 may be disposed adjacent the air inlet 28 to draw air into the plenum 22, as best shown in FIG. 8. It will be appreciated that a variety of other structures for drawing air into the plenum 22 through the inlet opening 28 may be employed. As shown in FIGS. 4 and 5, a mesh screen 34 may be secured to the first end 24 of the plenum 22 over the air inlet 28. The mesh screen 34 allows air to flow therethrough and into the plenum 22 while also preventing debris from being drawing therein.

According to one aspect, the air regulator mechanism 30 may consist of a control module that allows the RPMS of the blower 32 to be controlled or adjusted to vary its speed and thus the airflow into the air inlet opening 28 and thus into the foaming chamber 70, as is discussed in more detail below. According to still another aspect, the air regulator mechanism 30 may consist of a vent 36 located remotely from the inlet opening 28. As shown in FIG. 4, the vent 36 may be disposed at the second end 26 of the plenum 22 such that it is located downstream from the air inlet 28 formed in the first end 24. It will be appreciated that the vent 36 may be disposed in other suitable locations along the plenum 22 that will allow air to be vented off to regulate the air flow into foaming chambers 70.

Figure 6:
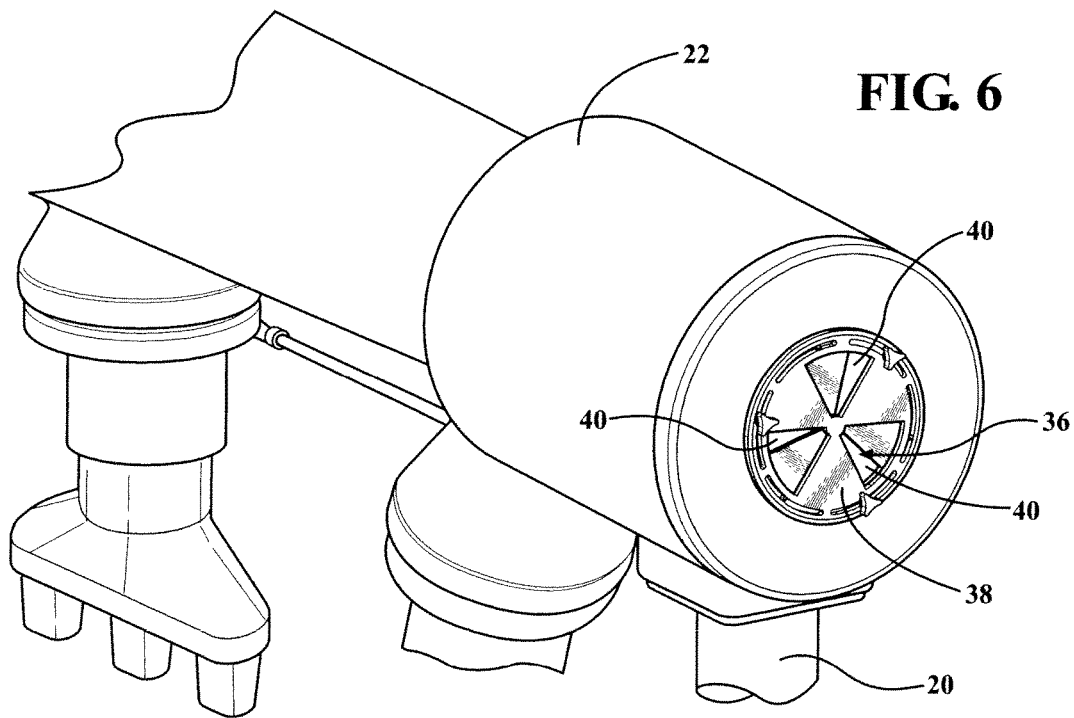
FIG. 6 is a perspective view of an airflow regulator mechanism for the device for emitting bubbles in accordance with an aspect of the disclosure.

According to an aspect, as best shown in FIG. 6, the vent 36 may consist of plate 38 that is secured to the second end 26 of the plenum 22. The plate 38 may have a plurality of openings 40 that allow air in the plenum 22 to be vented out instead of being transferred to the foaming chambers 70. This air regulator mechanism 30 allows for a less powerful fan package, which provides cost and energy savings. Additionally, because more air flows past the fan and the motor, better motor cooling is provided. It will be appreciated that the size and shape of the openings may vary. It will be understood that the plate 38 could simply consist of a single opening. According to a further aspect, a mechanism for varying the size of the openings, such as a rotatable disc with openings, could be employed to overlie the plate 38 vary the size of the openings and thus the amount of air being vented from the plenum 22. This will in turn vary the air flow in the device 10.

Figure 7:
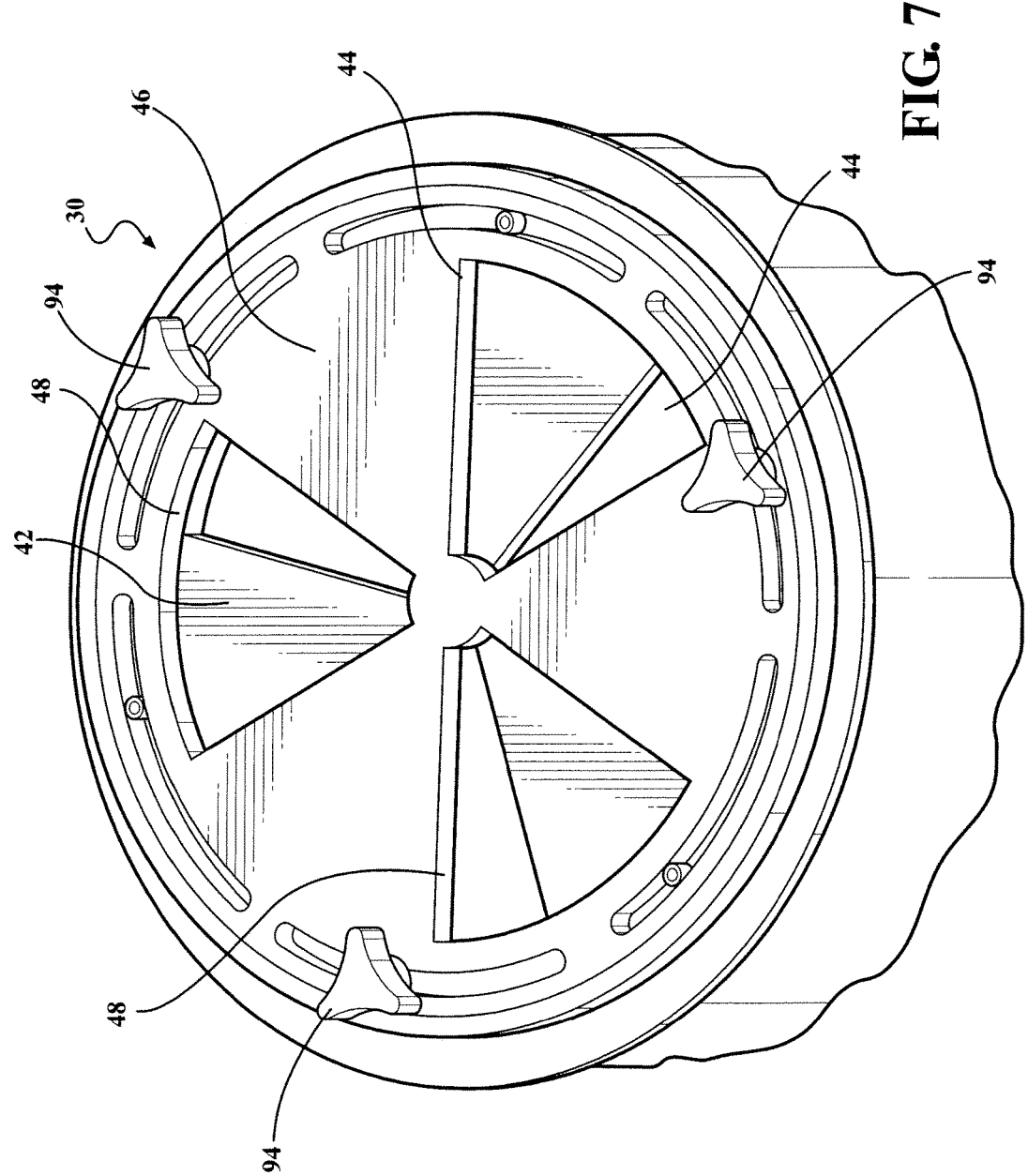
FIG. 7 is a perspective view of an airflow regulator mechanism for the device for emitting bubbles in accordance with an aspect of the disclosure.
Figure 9:
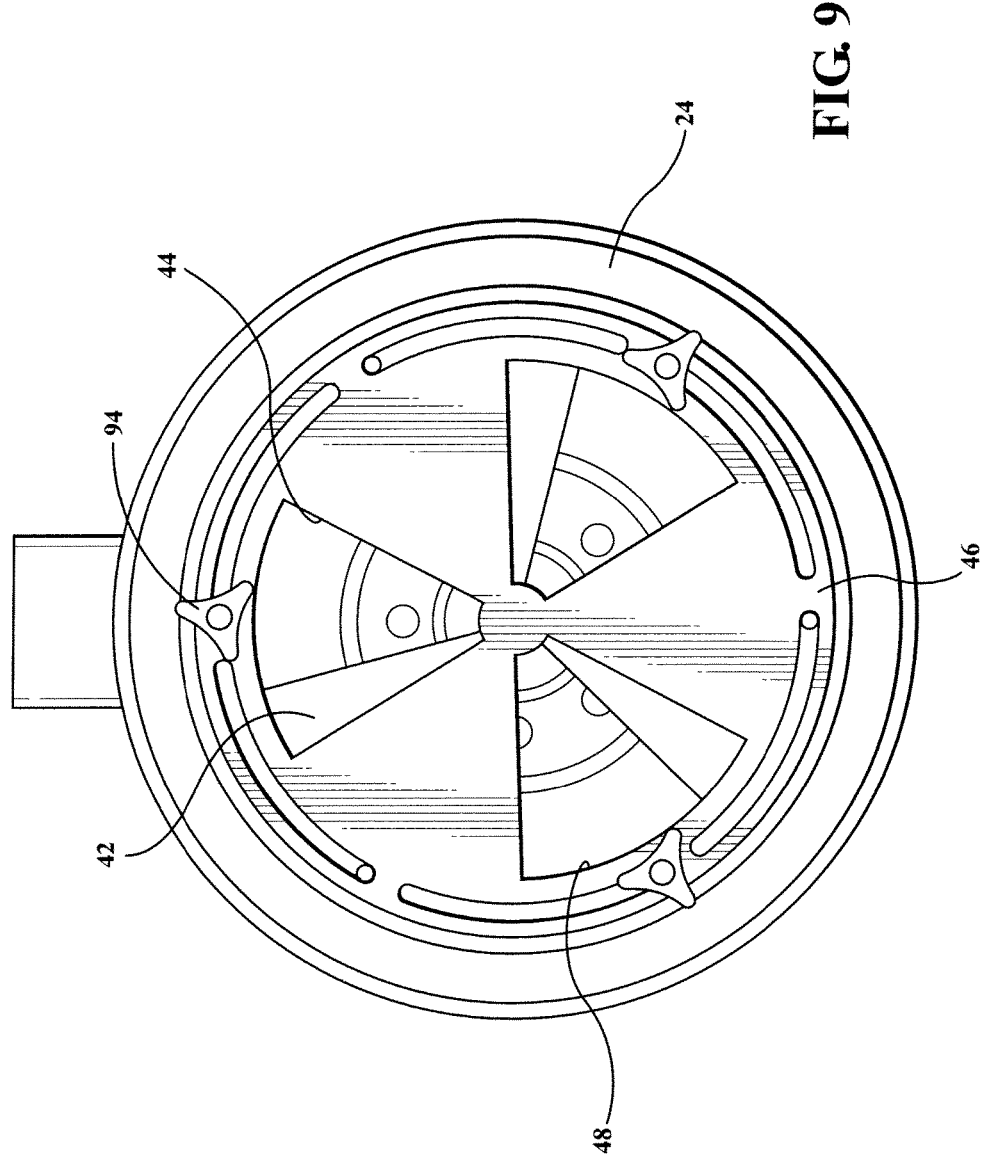
FIG. 9 is a front view of another airflow regulator mechanism for a device for emitting bubbles onto an exterior surface of a vehicle in accordance with an aspect of the disclosure.

FIGS. 7, 8 and 9 illustrate an air regulator mechanism 30 in accordance with this aspect. According to an aspect, the regulator mechanism 30 may be disposed adjacent the first end 24 of the plenum 22. According to an aspect, the regulator mechanism 30 may consist of a fixed plate 42 that is secured to and fixed with respect to the plenum 22. The fixed plate 42 may have a plurality of openings 44 formed therein through which air can pass. According to another aspect, the regulator mechanism 30 may also include a rotatable disk 46 that is rotatably connected to the fixed plate 42. According to a further aspect, the rotatable disk 46 may also include a plurality of openings 48 therein and can be disposed behind the fixed plate 42. According to still another aspect, the fixed plate 42 and the rotatable disk 46 may each include three openings that have the same size and shape. However, it will be appreciated that the number, the size and the shape of the openings can vary. It will be appreciated that a variety of other structures may be employed to alter and/or regulate the air flow through the air inlet 28 and/or through the plenum 22 to the foaming chambers 70.

In operation, the blower 32 may be configured to draw air into the plenum 22 through the plurality of openings 40 and 48 on the fixed plate 42 and the rotatable disk 46 respectively. According to an aspect, the rotatable disk 46 may be moved such that the openings 48 in the rotatable plate 46 are no longer completely aligned with the openings 44 in the fixed plate 42. By this configuration, the surface of the rotatable disk 46 can block some of the area of the openings 44 in the fixed plate 42 so that less area exists for the air to be drawn into the plenum 22. According to an aspect, the air regulator mechanism 30 may thus be configured to change to effective size of the inlet openings to vary the amount of air that is drawn into the plenum 22 as a result of the blower 32 as well as its velocity. It will be appreciated that the air regulator mechanism 30 can take on a variety of different configurations. According to an aspect, the blower may also include a motor 90 and an impeller 92 for drawing air into the plenum 22. As also shown, once the rotatable disk 46 is in its desired position with the openings sized to properly tune the airflow in the device 10, a plurality of knobs 94 can be tightened to secure the rotatable disk 46 in place. It will also be appreciated that a variety of other suitable mechanism may be employed to draw or force air into the plenum 22.

According to an aspect, the device 10 includes a plurality of nozzles portions 50 for emitting bubbles from the device. Each of the plurality of nozzle portions 50 may be secured adjacent an outlet opening 52 formed in a surface of the plenum 22. Each of the nozzle portions 50 can include an inlet end 54 that is configured to communicate with a respective outlet opening 52 and to secure the nozzle portion to the plenum 22. According to an aspect, the nozzle portions 50 may be attached to the plenum 22 by a bayonet mounting connection 56. As shown, the inlet end 54 of the nozzle portion 50 can include a plurality of bayonet projections 56 disposed therearound that are configured to pass through slots 58 formed in the outlet opening 52. As will be appreciated, the bayonet projections 56 can be aligned with the slots 58 such that they can pass therethrough. Once the bayonet projections 56 have passed through the slots 58, they can engage a channel or other guide structure in the plenum 22. The nozzle portions 50 can then be rotated such that the bayonet projections 56 are no longer aligned with the slots 58 and the nozzle portion 50 is secured to the plenum 22. This allows for a quick attachment and detachment of the nozzle portion 50 from the plenum 22. According to another aspect, the nozzle portion 50 can be attached and detached from the plenum 22 without having to shut down the vehicle wash system. It will be appreciated that the nozzle portions can utilize a variety of different attachment mechanism to secure the nozzle portions thereto, such as via threaded connection. An O-ring, gasket, or other sealing mechanism 68 may be employed at the connection of the nozzle portion 50 to the plenum 22.

According to another aspect, each of the nozzle portions 50 can include an outlet end 60 with a plurality of spray nozzles 62 formed therein. As shown, the plenum 22 may include six nozzle portions 50 with each nozzle portion including three spray nozzles 62. It will be appreciated that the number of nozzle portions secured to the plenum 22 may vary. It will also be appreciated that the number of spray nozzles 62 formed in each nozzle portion 50 may also vary as desired. According to an aspect, the number of spray nozzles 62 may be greater than the number of outlet openings 52 to assist in the acceleration of air though the device 10, as is described in more detail below.

According to a still further aspect, the nozzle portions 50 may be formed from a rotational molding technique. Alternatively, the nozzle portions 50 could be formed from a blow molding process. It will be appreciated that other suitable forming or molding processes could be employed. With reference to FIG. 13, each of the nozzle portions 50 may be formed as two identical halves which are molded in a single molding process. The identical halves may be configured to be joined to form a single complete nozzle portion 50.

According to another aspect, each nozzle portion 50 can include a foaming chamber 70. It will be appreciated that in the illustrated embodiment, the device 10 can include six separate foaming chambers; one for each nozzle portion. Pursuant to this aspect, each foaming chamber 70 can include a media element 72 or a filter. According to a further aspect, the media element 72 may be an aerating structure, which allows for a high volume of low pressure air to pass therethrough for the formation of bubbles, as is discussed in more detail below. It will also be appreciated that the media element 72 may be constructed as a two dimensional or planer media. An exemplary media element can consist of a fine mesh screen. However, a variety of other suitable materials may be employed for the media elements 72.

According to a still further aspect, a spray jet 74 may be disposed in each foaming chamber 70 to allow a supply of chemical to be delivered thereto. According to an aspect, the chemical may be soapy water. However, a variety of other suitable chemicals may be employed. The spray jet 74 can be configured so that the chemical is directed onto the media element 72. According to an aspect, the media element 72 may be configured such that it is disposed across the entire area of the foaming chamber 70 such that air that flows therethrough must pass through the media element 72. As shown, the spray jet 74 may be configured such that direction of spray emitted therefrom can be generally parallel to the flow of air. Each of the spray jets 74 may be preferably oriented in each foaming chamber 70 such that it is oriented perpendicular to the media element 72. Put another way, the spray jet 74 may be oriented so that it is parallel to the air flow into the foaming chamber 70 such that the fluid emitted from the spray jet 74 may be efficiently disposed onto the media element 72. Each of the spray jets 74 may be in communication with a source of chemical such as through hose connection or the like. Each spray jet 74 may be oriented in a variety of different ways and may also receive chemicals in a variety of suitable fashions.

In operation, air can be drawn into the plenum 22 through the inlet opening 28 via the blower 32. The rate at which the air flows through the device 10 into the foaming chamber 70 can be controlled by the air regulator mechanism 30. The air in the plenum 22 may then be fed through each of the outlet openings 52 into each of the individual foaming chambers 70. In the foaming chamber 70, the air may then encounter the media element 72 and interact with the chemical solution thereon to form bubbles as the air passes through the media element 72. According to an aspect, the created bubbles may then be passed to each of the spray orifices 62 such that they may be emitted for use, such as for application onto an exterior surface of a vehicle. The speed of the air as it contacts the media element 72 will directly affect the size of the bubbles. According to an aspect, low pressure, high velocity air is employed as opposed to the pressurized air employed by prior foaming devices, the bubble size can be more readily controlled and may be smaller so as to require less chemical use. This provides a significant cost benefit as well as more aesthetically appealing bubbles.

According to an aspect, the plenum 22 and the nozzle portions 50 may be configured such that the bubbles are emitted from the spray nozzles 62 at a velocity in order to propel them onto the exterior surface 12 of the vehicle 14. In other words, the bubbles emitted from the spray nozzles 62 are emitted with enough force that the bubbles can be projected sideways, such as onto a side surface of a vehicle or vehicle wheels. This is a significant advantage over prior foam generation devices where the foam is emitted from the device and conveyed to the surface of a vehicle under the force of gravity only.

According to an aspect, the force to emit the bubbles onto the vehicles may come from the tapered relationship of the various components of the device 10. More specifically, the tapered relationship of the size of the inlet end 54 to the size of the orifice of the spray nozzles 62 assists in accelerating the air through the device without the need to utilize a source of pressurized air. According to another aspect, each of the nozzle portions 50 is designed such that it tapers geometrically and mathematically. Geometrically, the taper may result from a narrowing of the passage through which the fluid travels and it passes through the nozzle as shown in FIGS. 13-15. Mathematically, the air/fluid passes through multiple orifices and the outlet openings 52 has a smaller area than the inlet orifice 28. Similarly, the orifice of the spray nozzle 62 has a smaller area than that of the outlet opening 52. This configuration and relationship allows for an acceleration of the air and bubbles based on the Bernoulli principle, as will be understood by one of ordinary skill in the art.

As shown best in FIGS. 10 through 15, the size of each plenum outlet opening 52 may be smaller than the size of the air inlet 28. This allows for an acceleration of the air as it enters each foaming chamber 70. According to an aspect as best shown in FIGS. 13 and 14, each nozzle 50 may include a lower chamber 76 that is tapered due to a narrowing of the nozzle front wall 78 and the nozzle rear wall 80 in a direction of travel from the media element 72 to the spray nozzles 62. Thus, bubbles that are formed as a result of air interacting with the chemical solution on the media element 72 accelerate in speed as they travel through the lower chamber 76 toward the spray nozzle 62.

Additionally, the area of each of the spray nozzle 62 is smaller than the area of the foaming chamber 70. According to a further aspect, an outlet passage 82 connects the lower chamber 76 to each spray nozzle 62. As can be seen in FIGS. 13 and 14, the outlet passage 82 may also be tapered such that the bubbles are further accelerated as they therethough to assist in propelling them from each of the spray nozzles 62. According to an aspect, the area of each of the nozzle portions 50 may be tapered in multiple directions.

With reference to FIGS. 1 and 2, according to a further aspect, the nozzle portions 50 disposed adjacent each of the first end 24 and second end 26 may be angled such that the bubbles emitted therefrom may be propelled at an angle. For example, the middle nozzle portions 50*a*, 50*b*, 50*c*, and 50*d* may be configured to emit bubbles onto a top exterior surface 12 of the vehicle 14, while the end nozzle portions 50*e*, 50*f* may be configured to emit bubbles onto at least a portion of a side surface of the vehicle 14. It will be appreciated that more or less nozzle portions may be angled. Also, each of the nozzle portions may be oriented at different angles as desired.

In operation, the blower 32 draws air into the plenum 22 and forces it to the nozzle portions 50 and into the individual foaming chamber 70. The air regulator mechanism 30 allows the rate of airflow brought into the foaming chamber 70 to be regulated. This provides a tunability of air flow, which allows the consistency of the bubbles emitted from the device to be controlled. According to an aspect, this variability in air flow allows for the use of different chemicals to be employed with the device 10. According to an aspect, the device 10 can emit bubbles or streams of bubbles as opposed to foam, which is what is emitted from prior devices. As will be appreciated, bubbles use less chemical and thus are advantageous as compared to foam that requires more chemical and is thus more expensive.

According to a further aspect, the bubbles emitted from the device 10 may have an aesthetically pleasing quality. As will be appreciated because of the two dimensional aerating media element, the air interacting with the chemical thereon can create bubbles similar to conventional children's bubble makers. The bubbles may be relatively large such that they appear transparent. This is in contrast to the foam generated by other conventional devices where, to the extent any bubbles exist, they are very small and provide a different appearance.

According to still another aspect of the disclosure as exemplarily shown in FIG. 16, the device 100 may configured to direct or propel bubbles onto another structure, such as a rotary brush or a miter curtain. It will be appreciated that the brush could be side brush or a top wheel. According to this aspect, the device 100 may be configured as a standup component that is supported on ground. According to an aspect, the nozzle portion 102 may be configured to emit the bubbles in a direction generally parallel to ground. Alternatively, the nozzle portion 102 may be oriented at different angles. The device can include any number of nozzle portions that are configured at a variety of different angles. As shown, the device 100 may be configured to propel bubbles onto a vehicle wash component 104 having a plurality of media elements 106 for treating a vehicle as part of a vehicle wash process. According to an aspect, the device 100 may be configured to emit bubbles onto a variety of different structures, both in a vehicle wash facility and in other applications.

As shown, according to an aspect, the component 104 is configured with a plurality of self-supporting media elements 106 and a hub 108 that is designed to rotate at a lower RPM in order to provide a more pleasurable vehicle wash experience, such as disclosed in Applicant's co-pending U.S. patent application Ser. No. 13/668,058, entitled "An Improved Vehicle Wash Component", which was filed on Nov. 2, 2012, the disclosure of which is hereby incorporated by reference as though set forth fully herein.

According to this aspect, the device 100 can propel bubbles to a location adjacent the hub 108. Also, according to another aspect, the bubbles emitted from the device 100 have demonstrated a tendency to cling, whether to the media elements or to a vehicle exterior. This can provide the ability to coat the media elements with bubbles such that they can be transmitted to the vehicle exterior. Additionally, the slow rotation of the component 104 ensures that the bubbles will not be "popped" or thrown off of the media elements before they can be applied to the vehicle exterior.

According to still a further aspect, one or more light sources, such an LED light strip may be associated with the device adjacent the nozzles 102 such that bubbles may be illuminated with different colors as they are emitted from the nozzles. It will be appreciated that a variety of different light sources may be employed and which may be disposed in various locations to light up the bubbles. It will also be appreciated that the lights may be of different colors and that the light sources may be operated under computer control to vary the color at different points, to blink or flash at predetermined points or to accomplish various other functions to enhance a user's vehicle wash experience. Additionally, one or more light sources could be associated with the vehicle wash component.

According to yet a further aspect, a variety of different chemical products may be connected to the spray jets so that bubbles comprised of different chemicals may be transmitted to the foaming chamber before being emitted onto the vehicle exterior. For example, waxes may be utilized. Additionally, incompatible chemicals could be passed through the nozzles and caused to mix on the vehicle surface, such as some specialty waxes.

Figure 16:
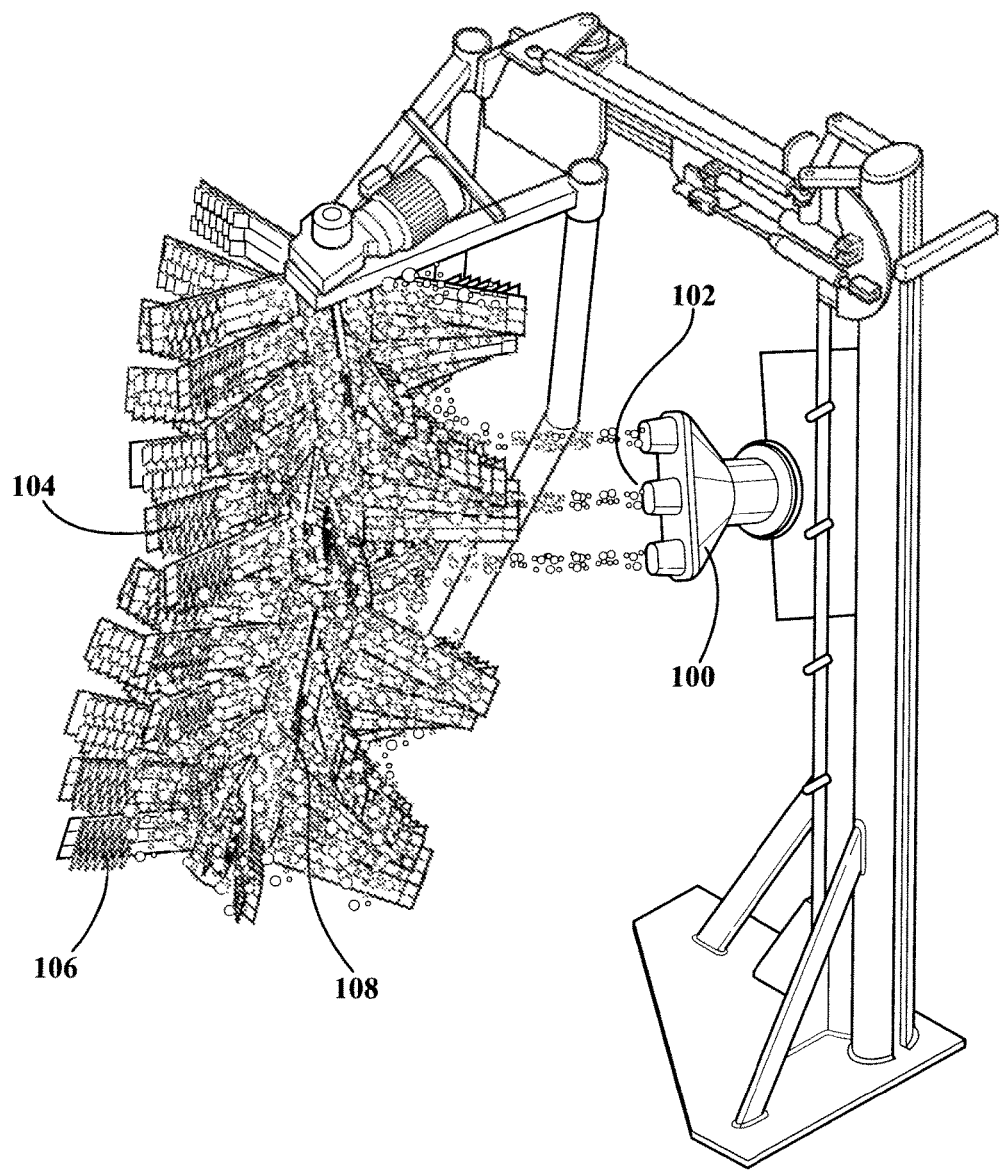
FIG. 16 is a perspective view of the device for emitting bubbles onto another component in accordance with an aspect of the disclosure.

According to still yet another aspect of the present disclosure, a method of applying bubbles to a vehicle exterior as part of a vehicle wash process is provided. According to this aspect, a device for creating bubbles may be disposed adjacent a vehicle treatment area of a vehicle wash facility. The device may have a variety of different configurations, however, according to an aspect, the device may be configured as set forth herein. As exemplarily shown in FIG. 16, the device may be configured to emit bubbles onto a vehicle treatment component, such as a rotary brush. The device may be configured to coat the entirety of the media elements of the vehicle treatment component with bubbles. Alternatively, the device may be configured to coat substantial portions of the media elements of the vehicle treatment component with bubbles.

According to an aspect, the vehicle treatment component can be configured to rotate at low RPMs in order to apply the bubbles resident on its media elements to a vehicle exterior. Application of bubbles to a vehicle exterior is a desirable feature as bubbles on the vehicle wash component can provide an impression of cleanliness, particularly knowing that the bubbles will be applied to the vehicle exterior. Because the vehicle wash component may be rotating at a low RPM, the application of the bubbles can occur in a paint friendly manner. According to an aspect, because of the slow rotation of the component, as the vehicle wash component contacts the vehicle, the bubbles will transfer from the media elements to the vehicle exterior.

According to a further aspect, the application of the bubbles to a vehicle as part of a vehicle wash process can be an option selected by a customer that may be obtained come as an additional charge ("the bubble treatment"). If a customer elects this feature, a device for emitting bubbles can be activated, such as by computer control. According to this aspect, the device will generate bubbles and apply them to one or more vehicle wash components. The bubbles can fully cover the media elements of the component and adhere thereto as the vehicle wash component is rotating. According to an aspect, the vehicle wash component is rotating slower and can apply the bubbles to the vehicles exterior that has been selected for this treatment. According to a still further aspect, lights may be employed to illuminate the bubbles and/or the vehicle wash components as part of the selection of the bubble treatment.

According to a still further aspect, if the next vehicle in line has elected not to have the bubble treatment, a controller associated with the device can be configured to prevent bubbles from being applied to the vehicle exterior. According to one aspect, a fluid can be applied to the vehicle wash component to eliminate the bubbles. The fluid may be a de-foaming agent. Alternatively, other fluids such as water may be applied to the vehicle wash component to eliminate the bubbles. It will be appreciated that a variety of other suitable fluids or devices for removing the bubbles may be employed. Additionally, other mechanism may be employed to remove the bubbles, including utilizing a vacuum to pull off any bubbles that may exist on the vehicle wash component. Other suitable mechanism and methods may be employed. According to this aspect, the same vehicle components can be utilized to provide different options to customers and thus the possibility of generating additional revenues for vehicle wash owners.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A device for emitting bubbles in a vehicle wash facility as part of a vehicle wash system, the device configured to be disposed adjacent a vehicle treatment area, comprising:
    an air plenum supported with respect to ground and including an air inlet having a first area and at least one air outlet having a second area wherein the second area is smaller than the first area, the air inlet in communication with ambient air to draw non-pressurized air into the air plenum;
    a nozzle portion coupled with the at least one air outlet of the plenum, the nozzle portion defining a foaming chamber and configured to receive air from the air plenum through an inlet end opening;
    an aerating media element disposed in the foaming chamber of the nozzle portion and configured to communicate with air emitted from the at least one air outlet of the air plenum;
    a fluid dispensing nozzle in communication with a source of chemical, the fluid dispensing nozzle including an outlet orifice disposed in the foaming chamber of the nozzle portion downstream from the inlet end opening of the nozzle portion, the outlet orifice positioned in generally parallel relationship with the inlet end opening and configured to emit a spray of a chemical within a stream of air from the air inlet opening and generally toward the aerating media element such that bubbles can be formed in the foaming chamber as a result of the air interacting with the chemical adjacent the media element; and
    the nozzle portion having at least one nozzle outlet opening in communication with and adjacent to the foaming chamber for emitting bubbles therefrom, wherein the nozzle outlet opening has a third area being smaller than the second area of the air outlet of the air plenum.

2. The device of claim 1, wherein the plenum includes an air regulator mechanism to control the amount of air being provided to the foaming chamber.

3. The device of claim 2, wherein the air regulator mechanism further comprises:
    a plate defining a plurality of plate openings each having a predetermined area; and
    a disc defining a plurality of disc openings overlying the plate and rotatable relative to the plate to vary the size of the plate openings to vary the amount of air being vented through the planum.

4. The device of claim 3, wherein the air regulator mechanism is disposed adjacent the air inlet.

5. The device of claim 3, wherein the air regulator mechanism is disposed remote from the air inlet.

6. The device of claim 1, wherein a source of the chemical is a supply of soapy water.

7. The device of claim 1, wherein the fluid dispensing mechanism is oriented to emit the chemical in a direction generally perpendicular to the aerating media element.

8. The device of claim 1, wherein the fluid dispensing mechanism is a spray jet.

9. The device of claim 1, wherein the at least one nozzle outlet opening includes a plurality of nozzle outlet openings for emitting the bubbles formed in the foaming chamber.

10. The device of claim 1, wherein the device is configured to emit the bubbles forcefully in a direction generally parallel to the nozzle outlet opening.

11. The device of claim 9, wherein the outlet portion is generally tapered in a direction from the foaming chamber to the outlet orifices.

12. The device of claim 1, further comprising:
    a plurality of air outlets formed in the air plenum;
    a separate foaming chamber in communication with each of the plurality of air outlets;
    an aerating media element disposed in each of the separate foaming chambers; and
    an individual nozzle outlet opening in communication with each of the foaming chambers.

13. A device for emitting bubbles, comprising:
    an air plenum including an air inlet and a plurality of air outlets, the air inlet having a first area and the plurality of air outlets each having a second area, whereby the first area is substantially larger than each of the second areas, the air inlet in communication with ambient air to draw non-pressurized air into the air plenum;
    a plurality of nozzle sections each disposed downstream from the air plenum and in communication with a respective one of the plurality of air outlets, each of the plurality of nozzle sections including a housing having:
    an air inlet end coupled with one of the plurality of air outlets and defining an inlet end opening for receiving air from the air plenum;
    a foaming chamber configured to receive air from the air plenum through the inlet end opening and including an aerating media element disposed therein in alignment with the inlet end opening and configured to communicate with air emitted from the at least one air outlet of the air plenum;
    a fluid dispensing mechanism including a fluid outlet orifice disposed in the foaming chamber positioned in generally parallel relationship with the inlet end opening, the fluid outlet orifice configured to emit a chemical in a direction of the media element within a stream of air from the air inlet opening and generally toward the aerating media element such that the chemical can interact with the air flowing through the media element to form a plurality of bubbles;
    an outlet section in communication with the foaming chamber for emitting bubbles generated in the foaming chamber from the device, wherein the outlet section includes a plurality of outlet orifices being spaced and generally parallel with the inlet end opening for emitting the bubbles in a direction generally parallel with the air that enters the inlet end opening, wherein each of the outlet orifices have a third area being smaller than the second area of the air outlet of the plenum;
    the plenum including an air regulator mechanism for varying the amount of air being vented through the plenum to control the amount of air being provided to the foaming chamber to control the consistency of the bubbles emitted from the outlet portion opening.

14. The device of claim 13, wherein the air regulator mechanism further comprises:
a plate defining a plurality of plate openings each having a predetermined area; and a disc defining a plurality of disc openings overlying the plate and rotatable relative to the plate to vary the size of the plate openings to vary the amount of air being vented through the planum.

15. The device of claim 14, wherein the air regulator mechanism is disposed adjacent the air inlet.

16. The device of claim 14, wherein the air regulator mechanism is disposed remote from the air inlet.

17. The device of claim 13, wherein the fluid dispensing mechanism is a spray jet in communication with a supply of soapy water.

18. The device of claim 13, wherein the fluid dispensing mechanism is a spray jet oriented to emit chemicals in a direction generally perpendicular to the aerating media element.

19. The device of claim 13, wherein the media element is a generally planar aerating media element.

20. The device of claim 13, wherein each of the nozzle sections is generally tapered in a direction from the foaming chambers to the outlet orifices.

21. The device of claim 13, wherein the each of the nozzle sections includes a plurality of bayonet projections extending radially outwardly from the air inlet end and spaced circumferentially from one another, wherein each of the plurality of air outlets includes a rim extending radially inwardly, wherein the rim defines a plurality of slots arranged in circumferentially spaced relationship with one another such that the slots may each receive one of the bayonet projections in order and configured to pass through corresponding openings in the plenum adjacent each of the outlet openings to secure each nozzle section to the plenum.

22. The device of claim 13, wherein at least two of the plurality of the nozzle sections are configured to emit bubbles at different angles with respect to one another.

23. A device for emitting bubbles in a vehicle wash facility as part of a vehicle wash system, the device configured to be disposed adjacent a vehicle treatment area, comprising:
an air plenum supported with respect to ground and including an air inlet and at least one air outlet, the air inlet in communication with ambient air to draw nonpressurized air into the air plenum;
a nozzle portion coupled with the at least one air outlet of the plenum, the nozzle portion defining a foaming chamber and configured to receive air from the air plenum through an inlet end opening;
an aerating media element disposed in the foaming chamber of the nozzle portion and configured to communicate with air emitted from the at least one air outlet of the air plenum;
a fluid dispensing nozzle in communication with a source of chemical, the fluid dispensing nozzle including an outlet orifice disposed in the foaming chamber of the nozzle portion downstream from the inlet end opening of the nozzle portion, the outlet orifice positioned in generally parallel relationship with the inlet end opening and configured to emit a spray of a chemical within a stream of air from the air inlet opening and generally toward the aerating media element such that bubbles can be formed in the foaming chamber as a result of the air interacting with the chemical adjacent the media element; and
the nozzle portion having at least one nozzle outlet opening in communication with and adjacent to the foaming chamber for emitting bubbles therefrom, wherein the nozzle outlet opening has an opening area being smaller than an outlet area of the air outlet of the air plenum.

24. The device of claim 23, wherein the air inlet has a first area, the at least one air outlet has a second area, and wherein the second area is smaller than the first area.

25. The device of claim 23, wherein the plenum includes an air regulator mechanism to control the amount of air being provided to the foaming chamber.

26. The device of claim 25, wherein the air regulator mechanism further comprises:
a plate defining a plurality of plate openings each having a predetermined area; and
a disc defining a plurality of disc openings overlying the plate and rotatable relative to the plate to vary the size of the plate openings to vary the amount of air being vented through the planum.

27. The device of claim 25, wherein the air regulator mechanism is disposed adjacent the air inlet.

28. The device of claim 25, wherein the air regulator mechanism is disposed remote from the air inlet.

29. The device of claim 23, wherein a source of the chemical is a supply of soapy water.

30. The device of claim 23, wherein the fluid dispensing mechanism is oriented to emit the chemical in a direction generally perpendicular to the aerating media element.

31. The device of claim 23, wherein the fluid dispensing mechanism is a spray jet.

32. The device of claim 23, wherein the at least one nozzle outlet opening includes a plurality of nozzle outlet openings for emitting the bubbles formed in the foaming chamber.

33. The device of claim 32, wherein the device is configured to emit the bubbles forcefully in a direction generally parallel to the nozzle outlet opening.

34. The device of claim 32, wherein the outlet portion is generally tapered in a direction from the foaming chamber to the outlet orifices.

35. The device of claim 23, further comprising:
a plurality of air outlets formed in the air plenum;
a separate foaming chamber in communication with each of the plurality of air outlets;
an aerating media element disposed in each of the separate foaming chambers; and
an individual nozzle outlet opening in communication with each of the foaming chambers.

* * * * *